No. 875,137. PATENTED DEC. 31, 1907.
C. L. TURNER.
BUTT SEAMING MACHINE.
APPLICATION FILED FEB. 14, 1907.

2 SHEETS—SHEET 1.

WITNESSES
Joseph T. Brennan
Charles S. Woodbury

INVENTOR
Charles L. Turner,
by Roberts & Mitchell,
his attorneys.

No. 875,137.  
PATENTED DEC. 31, 1907.  
C. L. TURNER.  
BUTT SEAMING MACHINE.  
APPLICATION FILED FEB. 14, 1907.  
2 SHEETS—SHEET 2.
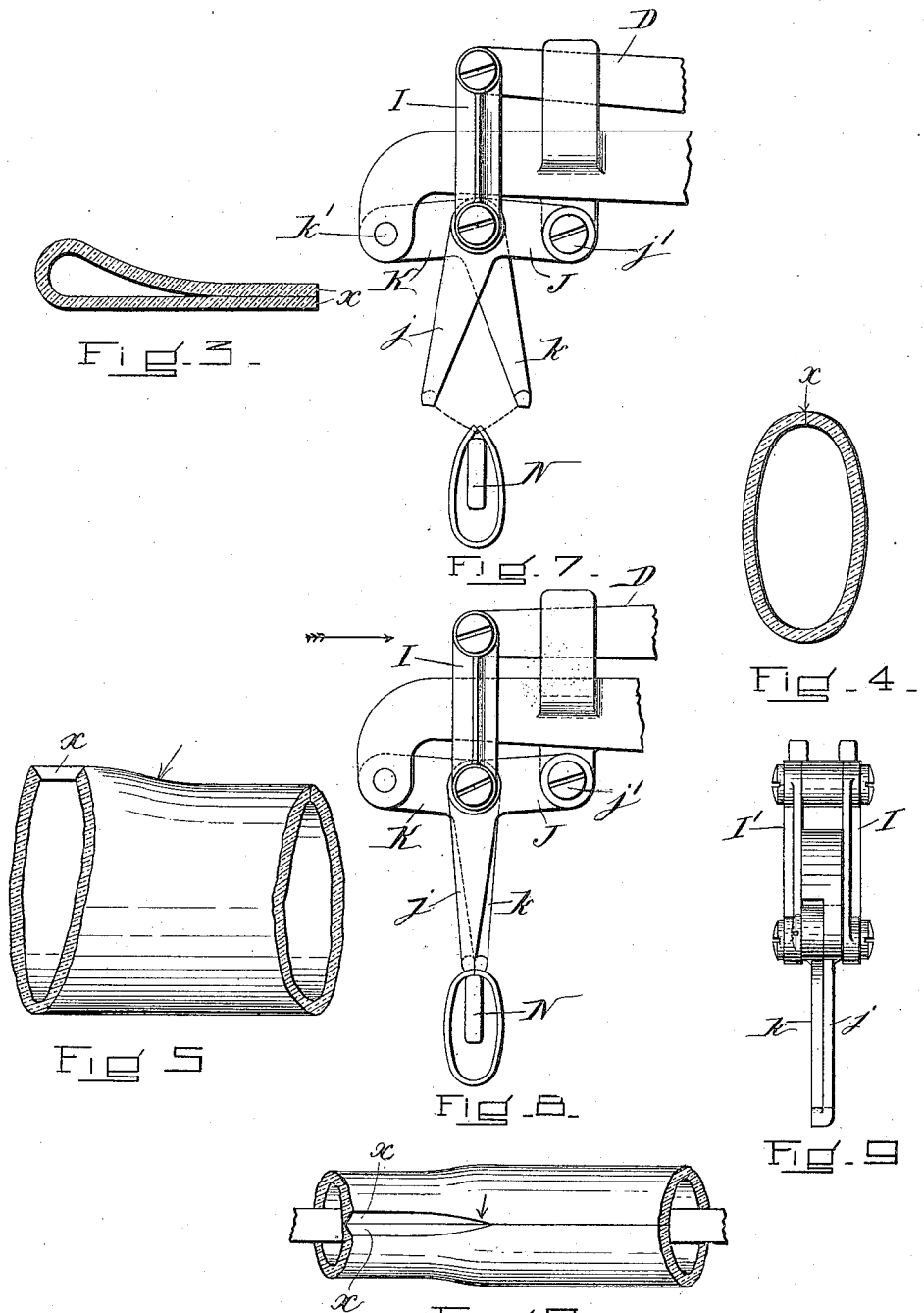
WITNESSES  
INVENTOR

UNITED STATES PATENT OFFICE.

CHARLES L. TURNER, OF READING, MASSACHUSETTS, ASSIGNOR TO THE DAVIDSON RUBBER COMPANY, OF BOSTON, MASSACHUSETTS, A CORPORATION OF MASSACHUSETTS.

BUTT-SEAMING MACHINE.

No. 875,137.     Specification of Letters Patent.     Patented Dec. 31, 1907.

Application filed February 14, 1907. Serial No. 357,377.

*To all whom it may concern:*

Be it known that I, CHARLES L. TURNER, a citizen of the United States, and resident of Reading, in the county of Middlesex and State of Massachusetts, have invented new and useful Improvements in Butt-Seaming Machines, of which the following is a specification.

My invention is a machine for butt-seaming rubber goods and the like.

Figure 1:
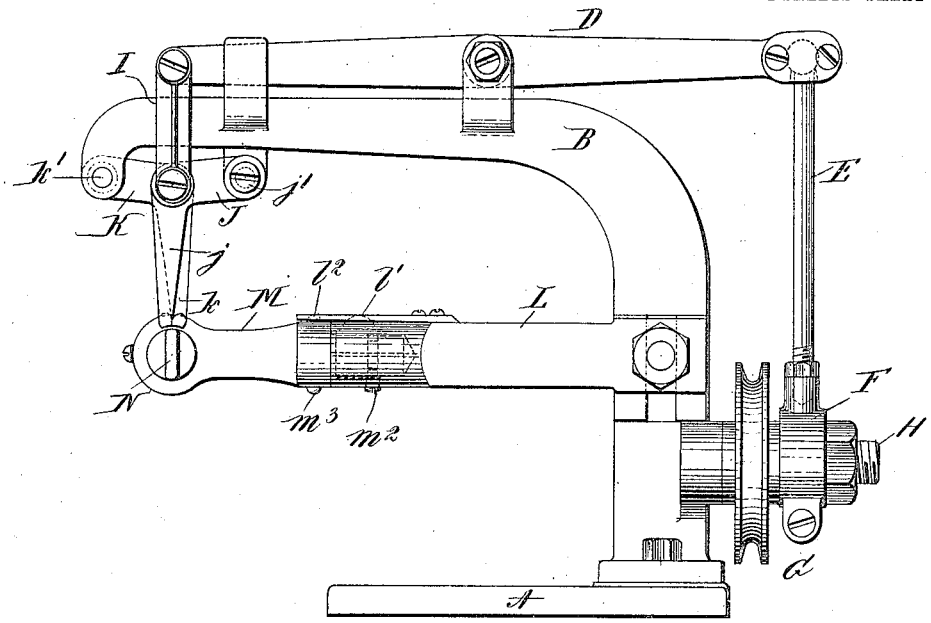
Figure 2:
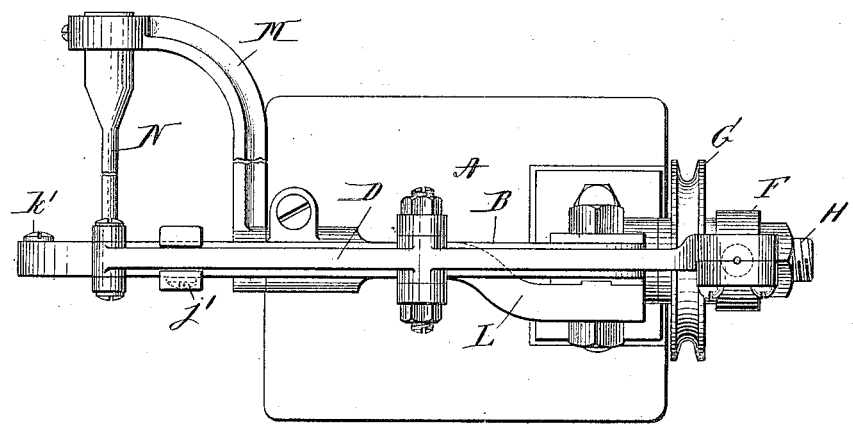

In the drawings,—Figure 1 is a side elevation of the machine; Fig. 2 is a plan view of Fig. 1; Fig. 3 shows a section of a rubber tube as prepared for seaming; Fig. 4 shows the same tube after the seaming operation; Figs. 5 and 6 show in elevation and plan a tube in which the butt-seaming operation has been partially completed; Fig. 7 is a detail showing the operating fingers in their raised position, the anvil and a small tube upon the anvil ready to be operated upon, the path of the operating fingers being indicated in dotted lines; Fig. 8 shows the fingers in closed position, the anvil and the tube with the edges of the tube butted together; Fig. 9 is an end elevation of Fig. 8 looking in the direction of the arrow.

My machine is especially applicable to the manufacture of band tubes from which rubber bands may be cut. Such tubes are made from sheet rubber the sides of which are bent around to meet and butt together, the butted edges being cemented by the application of pure rubber cement. After being so formed into a tube, the tube is cut transversely to form rubber bands of any desired width. Such tubes were formerly made by first cementing the two edges of the sheet material which it was designed to join and then by hand bringing these two edges into contact and permitting them to dry in this position. But this method was slow and imperfections occurred with considerable frequency owing to the neglect of the operator to press together every portion of the length of the opposed edges. A mechanical method has also heretofore been employed to effect the same purpose in which the edges of the sheet rubber material were tacked together by cement and then passed over an anvil having a hollow face upon which a hammer having a face curved into approximation with the curve in the hollow of the anvil was operated and hammered the two edges into contact. This hammering process, however, thinned the edges by the blow at the time when they were united and they were united in this compressed or thin condition, leaving a condition of tension in the compressed rubber at the point of junction which was found disadvantageous to the wearing quality of the bands produced and which frequently caused the edges to partially separate before the drying was effected.

In the method which is worked by the machine which is the subject matter of this application, the seam instead of being hammered and compressed and thinned at the point of junction is by mechanical fingers, drawn together and the material is accumulated at the seam as contrasted with the thinning of the material by the hammering process.

In the drawings A is the base of my machine which may be secured upon any suitable work table.

B is a curved standard or arm supporting the operating parts of the machine. Pivoted upon the longitudinal upper part of the standard B is a lever D connected at one end by a connecting rod E with an eccentric F fast to a pulley G driven from any source of power, the eccentric and pulley being mounted upon a pin H projecting from the frame of the machine. At the other end of the lever D links I, I' are pivoted which are connected at their lower ends respectively with two bell crank levers J and K, the free ends of these levers forming the fingers $j$, $k$, the function of which will be hereinafter more particularly described and specified. Secured to the upright portion of the standard B directly beneath the horizontal portion of the standard B is an arm L which may be adjusted up and down upon the upright portion of the arm B and which carries the anvil arm M which, in turn, carries the anvil N. The anvil arm M is preferably pivoted in the outer end of the arm L so that it may be turned to various positions if desired and in this way and in connection with the adjustability of the arm L provides for adjustment of the anvil for work of different kinds. As indicated in the drawings the outer end of the arm L is recessed for the reception of a tang $m$ integral with the anvil arm M. This tang $m$ has an annular groove $m'$ into which passes the end of a screw $m^2$ to hold the tang against longitudinal movement while permitting rotation. Upon the top of arm L is a leaf spring $l'$ the free end of which has a recess $l^2$ and overlies the hub of anvil arm M. Upon this hub are pins $m^3$ so positioned that as the arm is turned they will wedge up the spring $l'$ until the recess $l^2$ registers with a pin $m^3$ to latch the arm M in the desired position.

The operation of my machine is as follows: As shown in the drawings, Figs. 7 and 8, the bell crank fingers $j$ $k$ are shown at the two extreme positions. In Fig. 7 they are drawn to their highest position preparatory to making a stroke while in Fig. 8 the stroke is shown as completed. In Fig. 3 the sheet material from which the tube is formed is shown as it is after the application of the cement to the edges, which are finally to be butted together. The sheet material being laid as shown in Fig. 3 and the cement applied to the edges $x$, the cement tacks the edges together sufficiently to permit of the tube in this state being placed upon the anvil where the edges and the tube assume approximately the shape indicated in the drawing, Fig. 7. In the operation of the machine, when the lever D makes its down stroke, the fingers $j$ $k$ swinging upon the pivots $j'$ and $k'$ of their respective bell crank levers J, K, being actuated by the links I, I' which connect the respective bell crank levers at their angle with the lever D, move in the path indicated in dotted lines in Fig. 7, encountering the edges of the tube, the rubber yields downward toward the anvil and the fingers slip together wedging the edges of the rubber below them upon the anvil which is adjusted at the proper height and turning the cemented edges face to face and bringing these edges into intimate contact under pressure. Upon reversal of the movement of lever D, the fingers which when they had completed their stroke were in the position shown in Fig. 8, resume their position as shown in Fig. 7. The tube is, between strokes of the fingers, moved slightly longitudinally upon the anvil to bring a fresh portion of the tube seam within the path of the fingers, but as these fingers move with great rapidity, the practical effect is, so far as the operator is concerned, that the operator appears to continuously move the tube. In Figs. 5 and 6 is shown the appearance of the tube during the operation, a portion of the tube being closed and seamed while another portion of the seam is still merely tacked together at the edges. The gradual movement of the tube along the anvil combined with the rapid movement of the fingers results in the fingers very rarely striking the tube in the manner that is indicated in Fig. 7; but the fingers in fact strike each stroke at a point near the bottom of the rise, indicated by the arrow in Figs. 5 and 6, pressing the seam together where it has already partially been drawn together by previous strokes. And so this cumulative closure and butting of the seam is carried on from one end of the tube to the other.

What I claim is:

1. In a butt seaming machine, the combination of an anvil and opposed fingers pivoted to swing in successive oppositions near one face of the anvil to butt a portion of the edges of the material together at each successive opposition, substantially as described.

2. In a butt seaming machine the combination of bell crank lever fingers, pivoted at one end to the machine and at the angle of the bell-crank to an actuating lever and an anvil coöperatively supported with relation to the bell-crank lever fingers.

Signed by me at Boston, Massachusetts, this 11th day of February, 1907.

CHARLES L. TURNER.

Witnesses:
 JOSEPH T. BRENNAN,
 C. D. WOODBERRY.